United States Patent
McAllister

(10) Patent No.: US 6,671,792 B1
(45) Date of Patent: Dec. 30, 2003

(54) SHARE MASKS AND ALIAS FOR DIRECTORY COHERENCY

(75) Inventor: Curtis R. McAllister, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/560,909

(22) Filed: Apr. 28, 2000

(51) Int. Cl.$^7$ ............................................. G06F 12/00
(52) U.S. Cl. ....................... 711/220; 711/206; 711/159; 711/133
(58) Field of Search ................................. 711/118, 133, 711/141, 202, 203, 204, 205, 210, 169, 220, 206, 207

(56) References Cited

U.S. PATENT DOCUMENTS

| | | | | | |
|---|---|---|---|---|---|
| 5,550,995 | A | * | 8/1996 | Barrera et al. ................. | 711/3 |
| 5,860,138 | A | * | 1/1999 | Engebretsen et al. ....... | 711/202 |
| 5,890,221 | A | * | 3/1999 | Liu et al. .................... | 711/210 |
| 5,893,152 | A | * | 4/1999 | Fuller et al. ................. | 711/141 |
| 6,006,312 | A | * | 12/1999 | Kohn et al. .................. | 711/210 |
| 6,035,427 | A | * | 3/2000 | Kweon ........................ | 714/702 |

\* cited by examiner

Primary Examiner—Do Hyun Yoo
Assistant Examiner—Brian R. Peugh

(57) ABSTRACT

A directory tag for each cache line in a memory within a multiprocessor distributed memory system includes a share mask and an alias signature. The share mask is used to keep track of entities of the system that share the cache line, and is encoded into a fixed length field having a number of bits that is significantly less than the number of the entities. The share mask is utilized for maintaining coherency among shared data in the system. Before a request to access a location of a memory is granted, the share mask is used to identify each entity or a group of entities that share the particular location, and an invalidate message is sent to each of the identified entity or group of entities, eliminating the need to broadcast the message to all entities in the system, and thus conserving the communication bandwidth of the system. The alias signature in the directory tag is compared with an alias signature computed from the memory access request to prevent data corruptions that may occur due to incorrect memory aliasing.

10 Claims, 6 Drawing Sheets

501
PARTITION MASK

| 13 | 12 | 11 | 10 | 9 | 8 | 7 | 6 | 5 | 4 | 3 | 2 | 1 | 0 |
|---|---|---|---|---|---|---|---|---|---|---|---|---|---|
| 1/0 | 1/0 | 1/0 | 1/0 | 1/0 | 1/0 | 1/0 | 1/0 | 1/0 | 1/0 | 1/0 | 1/0 | 1/0 | 1/0 |

*Fig. 5*

SHARE MASKS AND ALIAS FOR DIRECTORY COHERENCY

TECHNICAL FIELD

The invention relates to computer processors and memory systems. More particularly, the invention relates to optimizing coherent memory access operations within multiprocessor computer systems having distributed shared memory architectures.

BACKGROUND ART

Multiprocessor, or parallel processing, computer systems rely on a plurality of microprocessors to handle computing tasks in parallel to reduce overall execution time. One common implementation of a multiprocessor system is the "single bus architecture, in which a plurality of processors are interconnected through a single bus. However, because of the limited bandwidth of the single bus also limits the number of processors that can be interconnected thereto, recently a networked multiprocessor systems have also been developed, which utilize processors or groups of processors connected to one another across an interconnection fabric, e.g., a network, and communicating via "packets" or messages.

Typically, in a networked multiprocessor system includes a plurality of nodes or clusters interconnected via a network. For example, FIG. 1 shows an exemplary networked multiprocessor system 100, in which a plurality of nodes 102 are interconnected to each other via the interconnection fabric 101, e.g., a network. By way of an example, only two nodes are shown. However, the networked multiprocessor system 100 may have any number of nodes. Moreover, although, in FIG. 1, the interconnection fabric 101 is shown to provide interconnections only between the nodes 102, all system entities, including the cells 103, the processors 105 and the memories 104, are interconnected, and communicate, with the rest of the system through the interconnection fabric 101.

Each of the nodes 102 of the networked multiprocessor system 100 may be further divided into a smaller hierarchical units—referred herein as "cells" 103—, which comprises a plurality of processors 105 and a shared memory 104. Each processor 105 may comprise any processing elements that may share data within the distributed shared memory in the system, e.g., a microprocessor, an I/O device or the like. The grouping into nodes and/or cells of the system entities may be made physically and/or logically.

Each of the shared memory 104 may comprise a portion of the shared memory for the system 100, and may include a memory controller (not shown) and/or a coherency controller (not shown) to control memory accesses thereto from various processors in the system, and to monitor the status of local copies of the memory stored in caches of various processors in the system.

In a networked multiprocessor system such as one described above, multiple copies of a piece of data from the shared memory may be stored in the caches of various processors. Each processor that has a copy of the data in its cache is said to "share" the data—the data is often referred to as one or more "cache lines". In order to maintain a proper operation of the networked multiprocessor system, it is critical to ensure that all copies of any shared data must be identical to the data in the shared memory, e.g., a coherency between the copies and the data in the memory must be ensured.

Prior attempts to address the above coherency problem is to broadcast an "invalidate" signal, whenever the shared memory location is updated, to every entity, e.g., processors 105, in the system 100 that may potentially share the memory location so that each of the entity may "invalidate" the copy in its cache, and the data would be obtained from the memory rather than the entity's cache in a subsequent access.

Unfortunately, however, the broadcasting of invalidate signal to all potential sharers, e.g., all processors 105, is wasteful of the system bandwidth since as many invalidate messages as there are processors in the system must be sent, and the resulting invalidate response messages from each of the processors, across the system interconnect fabric 101 and/or the data paths connecting each processors to the system. This lowers the system performance.

Prior attempts were made to address the above waste of system bandwidth by restricting the sharing of memory to within one of the nodes 102 at a time. This approach is inefficient and inflexible in that if a new sharer from a different node was to be added to the list of sharers, the other sharers in the list must be invalidated first before the new sharer can be added. This tend to increase the invalidate message traffic, and thus has negative system performance implications, particularly for cache lines that should preferably be shared as read-only by all processors.

Moreover, in a distributed shared memory system, an address aliasing error, e.g., error during a translation from physical address to a virtual address, may result in a duplicate copy of a cache line, addresses of the copies being different from each other. This may disturb the data coherency of the system, and eventually cause data corruptions, which often result in a fatal system crash.

Prior attempts to address this aliasing error problem includes running a large test suit under system software and looking for signs of data corruption. Unfortunately, however, this prior solution is an after-the-fact approach that can only detect data corruption, i.e., after a data corruption has already happened.

Thus, there is a need for more efficient method and device for providing tracking of the system entities that may share a cache line to maintain data coherency in a multiprocessor system, which avoids sending coherency messages to all entities in the multiprocessor system.

There is also a need for more efficient method and device for detecting an address aliasing error before a corruption of data occurs.

SUMMARY OF INVENTION

In accordance with the principles of the present invention, a method of data sharing in a distributed computing system having a plurality of processing elements and at least one memory having stored therein a plurality of cache lines comprises providing a plurality of shared masks, each of the plurality shared masks corresponding to an associated one of the plurality of cache lines in the at least one memory, and each of the plurality of shared masks having a plurality of bits, each of the plurality of bits indicating whether at least one of the plurality of processing elements may be sharing the associated one of the plurality of cache lines, and wherein the number of the plurality of bits is less than the number of the plurality of processing elements.

In addition, in accordance with the principles of the present invention, an apparatus for data sharing in a distributed computing system having a plurality of processing elements and at least one memory having stored therein a plurality of cache lines comprises a plurality of shared masks, each of the plurality shared masks corresponding to an associated one of the plurality of cache lines in the at least one memory, and each of the plurality of shared masks having a plurality of bits, each of the plurality of bits being associated with one or more of the plurality of processing elements, and each of the plurality of bits indicating whether respective associated one or more of the plurality of processing elements may have a copy of the associated one of the plurality of cache lines, and wherein a number of the plurality of bits is less than a number of the plurality of processing elements.

In accordance with another aspect of the principles of the present invention, a method of detecting an address aliasing error in a computing system having at least one memory having stored therein at least one cache line comprises providing a directory tag alias signature for each of the at least one cache line, the directory tag alias signature having encoded therein a signature of an address information of the at least one cache line, detecting a request to access the at least one cache line, the request including a requested address information of the at least one cache line, computing a computed alias signature based on the requested address information, comparing the directory tag alias signature with the computed alias signature to determine if the directory tag alias signature and the computed alias signature match each other, and indicating an occurrence of the address aliasing error if the directory tag alias signature and the computed alias signature do not match each other.

DESCRIPTION OF DRAWINGS

Features and advantages of the present invention will become apparent to those skilled in the art from the following description with reference to the drawings, in which:

FIG. 5 shows an illustrative example of the partition mask in accordance with an embodiment of the present invention;

DETAILED DESCRIPTION OF PREFERRED EMBODIMENTS

For simplicity and illustrative purposes, the principles of the present invention are described by referring mainly to an exemplar embodiment thereof. However, one of ordinary skill in the art would readily recognize that the same principles are equally applicable to, and can be implemented in, a multiprocessor shared memory system having a different implementation or architecture, and that any such variation would be within such modifications that do not depart from the true spirit and scope of the present invention.

For example, while much of the following description of the present invention makes references to multiprocessor systems, it should be appreciated that the concept of distributing tasks between processors in multiprocessor systems may also be applied to distributed computer systems which distribute tasks between different computers in a networked environment (e.g., a LAN or WAN). Further, many of the functions and problems associated with multiprocessor and distributed computer systems are quite similar and equally applicable to both types of systems. Consequently, the term "networked computer system" will be used hereinafter to describe both systems in which the nodes are implemented as individual microprocessors or groups of processors (multiprocessor systems) or as individual computers which may separately utilize one or more processors (distributed computer systems).

Moreover, the present invention is described with reference to a particular implementation in which there are a particular number of processors for each cell, a particular number of cells per node, etc. However, it should be apparent to those having an ordinary skill that the system described herein may have any number of processors and cells, and that any such variation would be within such modifications that do not depart from the true spirit and scope of the present invention.

In accordance with the principles of the present invention, a directory tag for each cache line in a memory within a multiprocessor distributed memory system includes a share mask and an alias signature. The share mask is used to keep track of entities of the system that share the cache line, and is encoded into a fixed length field having a number of bits that is significantly less than the number of the entities. The share mask is utilized for maintaining coherency among shared data in the system.

Before a request to access a shared location of a memory is granted, the share mask is used to identify each entity or a group of entities that share the particular location, and an invalidate message is sent to each of the identified entity or group of entities, eliminating the need to broadcast the message to all entities in the system, and thus conserving the communication bandwidth of the system. The alias signature in the directory tag is compared with an alias signature computed from the memory access request to prevent data corruptions that may occur due to address aliasing errors.

Figure 1:
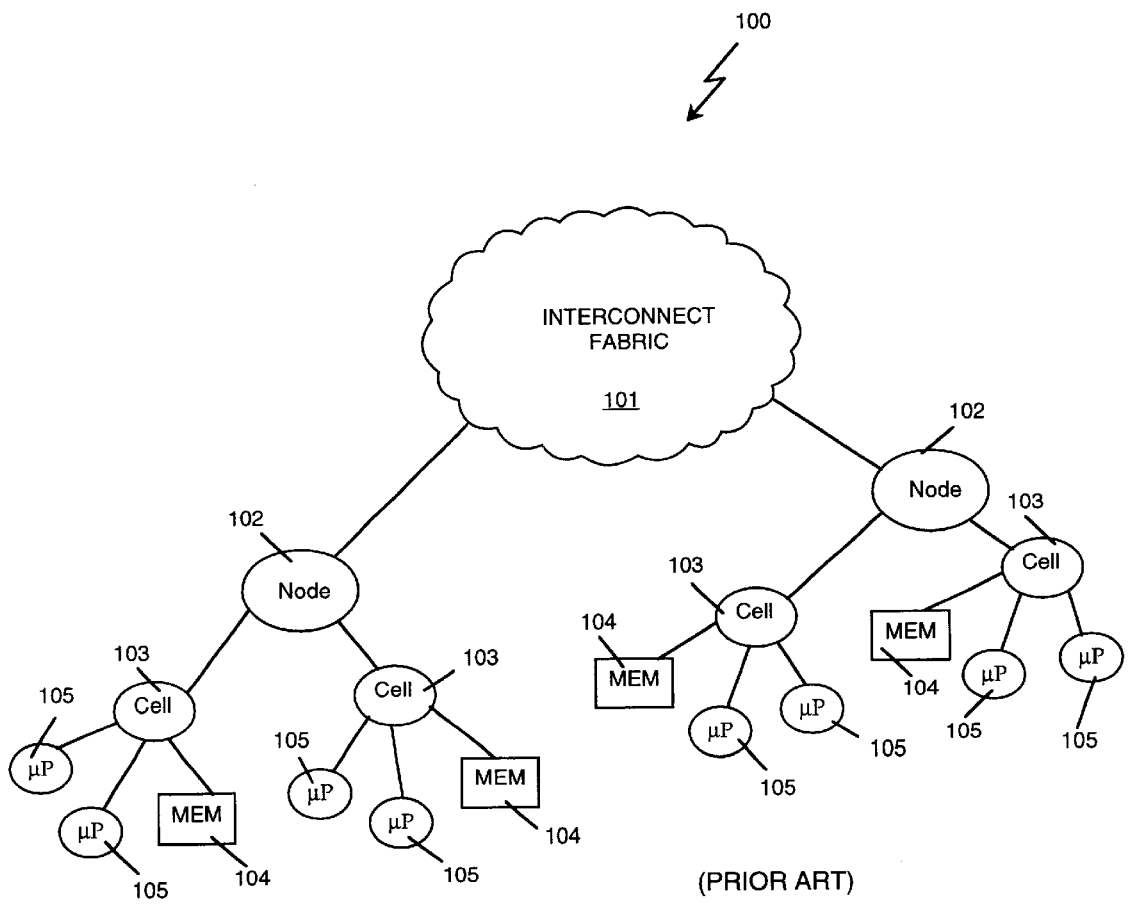
FIG. 1 is a block diagram of the relevant portions of an exemplary conventional networked multiprocessor distributed memory system.
Figure 2A:
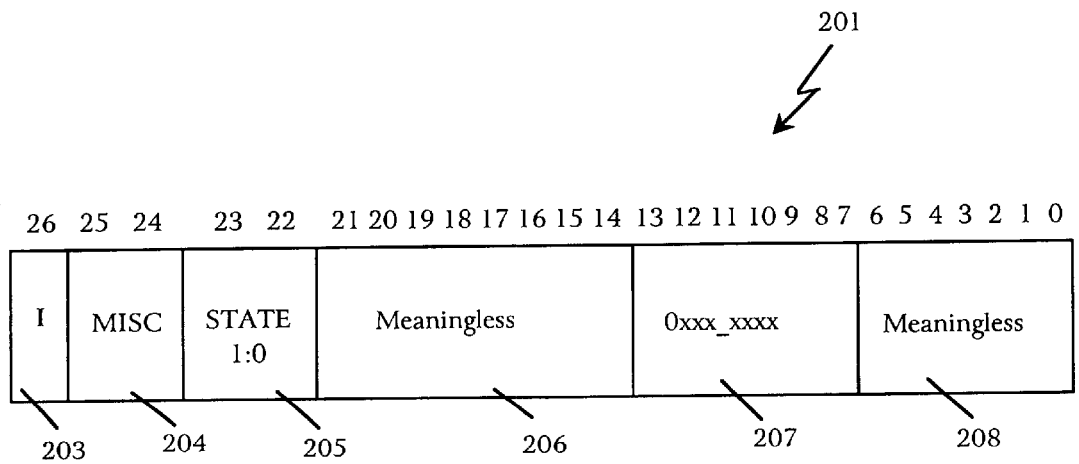
FIG. 2A is an illustrative table showing relevant portions of an exemplary embodiment of the directory tag bits of a cache line, for the case in which the cache line is idle, in accordance with the principles of the embodiment of the present invention.
Figure 2B:
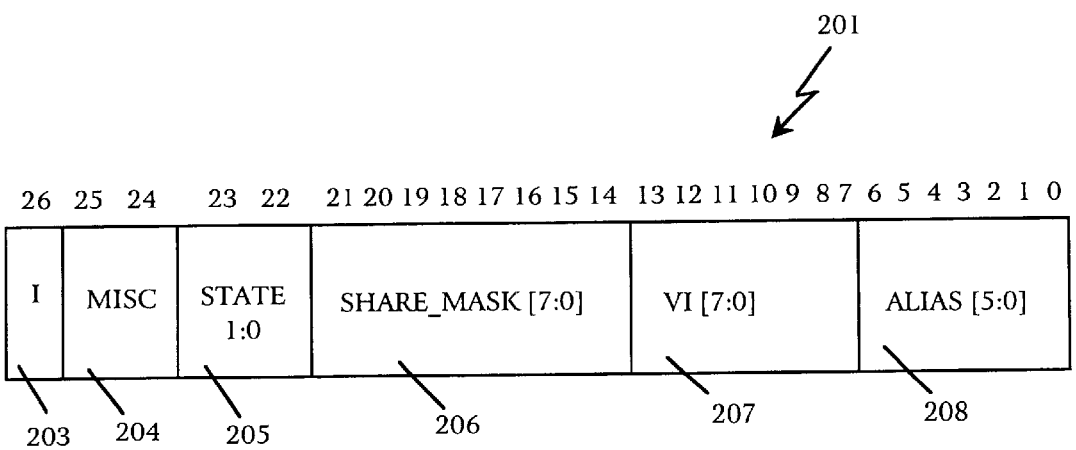
FIG. 2B is an illustrative table showing relevant portions of an exemplary embodiment of the directory tag bits of a cache line, for the case in which the cache line is being shared, in accordance with the principles of the embodiment of the present invention.

In particular, in accordance with the principles of the present invention, directory tag bits are provided for each cache line stored in a memory of the networked multiprocessor distributed memory system (e.g., shown in FIG. 1), an exemplary embodiment of which is shown in FIGS. 2A and 2B.

As shown in FIGS. 2A and 2B, in an embodiment of the present invention, the directory tag bits 201 comprise 27 bits, TAG [26: 0], arranged as a number of fields, including: an one bit Idle field (I) 203 (TAG [26]), a two bits miscellaneous field (MISC) 204 (TAG [25:24]), a two bits state field (STATE) 205 (TAG [23:22]), an eight bits share mask field (SHARE$_{13}$ MASK) 206 (TAG [21:14]), an eight bit virtual index field (VI) 207 (TAG [ 13:6]) and a six bits alias signature field (ALIAS) 208 (TAG [5:0]);

The MISC field contains miscellaneous information associated with the cache line, e.g., for performing housekeeping operations. The idle field (I)203, the state field (STATE) 205 and the highest bit of the virtual index (VI [7]) field 207 are used to encode the relevant state of the cache line as shown in table 1:

TABLE 1

| I, STATE [1:0], VI [7] | State |
|---|---|
| 1xxx or 0000 | IDLE |
| 0001 | I/O PRIVATE |
| 0001x | CPU PRIVATE |
| 010x | INTRA-NODAL SHARED (2 cells/bit) |
| 011x | INTER-NODAL SHARED (8 cells/bit) |

If a cache line is in the "idle" state, the cache line is owned exclusively by the memory, and thus is not shared by any system entity. The states "CPU PRIVATE" and "I/O PRIVATE" each indicate that the cache line is exclusively owned by a processor or an I/O device, respectively.

The state "INTRA-NODAL SHARED" indicates that the cache line is shared by cells 103 that are located within the same node 102 in which the particular shared memory 104 is located.

Finally, the state "INTER-NODAL SHARED" indicates that the cache line may be shared by cells 103 that are located outside the node 102 in which the particular shared memory 104 is located.

As can be seen from FIG. 2A, when a cache line is "idle", i.e., owned exclusively by the memory, the $SHARE_{13}$ MASK and the ALIAS fields do not have any meaning, and the contents thereof may be ignored.

Although for the purpose of illustration only, the following description is given with reference to a specific embodiment in which a particular number of processors 105 and cells 103 are included in each of the nodes 102 in the system 100, it should be understood that a node 102 may include any number of cells 103, and that a cell 103 may comprise any number of processors 105.

In an embodiment of the present invention, a cell 103 comprises four (4) processors 105 and at least one memory 104, a node 102 comprises sixteen (16) cells 103, and there are four (4) nodes 102 in the system. In addition, a memory 104 comprises a memory controller and a coherency controller to control the data traffic to and from the memory 104, and to control coherency operations, respectively. A memory 104 has stored therein the above described directory tag bits for each cache line.

Every processors 105 and the memory 104 within a single cell 103 share a unique cell ID. In a preferred embodiment of the present invention, the cells 103 are connected through an interconnect mechanism which has non-uniform latency and bandwidth characteristics. The interconnect mechanism is such that cells which are physically located close together have a lower-latency, higher bandwidth connection than cells that are physically far apart. The cell IDs are chosen so that cells which are physically close to each other also have only the LSBs of their cell IDs different, i.e., cells 4 and 5 are physically close whereas cells 1 and 16 are physically far apart.

Figure 3A:
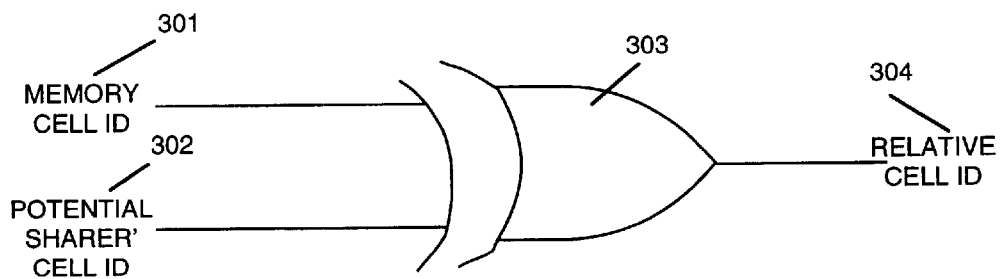
FIG. 3A shows an exemplary embodiment of a mechanism for obtaining a relative cell identification number in accordance with an aspect of the principles of the present invention.
Figure 3B:
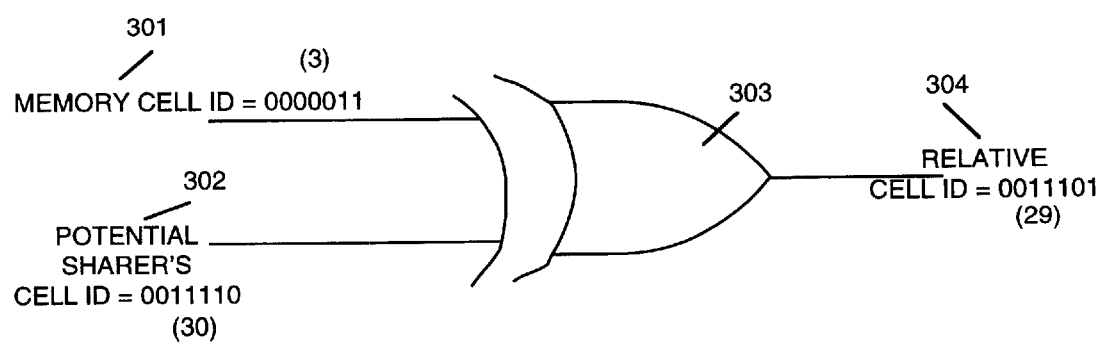
FIG. 3B shows an example illustrating the operations of the mechanism for obtaining a relative cell identification number shown in FIG. 3A.

As shown in FIGS. 3A and 3B, a relative cell ID is constructed by exclusive-ORing together the cell ID of the memory 104 with the cell ID of a potential sharer of a cache line in the memory 104. For example, if the memory 104 is in cell number 3, i.e., the cell ID of the memory 104 is 3 (0000011), and a sharer is in the cell number 30 (0011110), e.g., the sharer is a processor 105 located in cell number 30, then the resulting relative cell ID for the sharer relative to the particular memory in cell number 3 would be 29 (0011101) as shown in FIG. 3B.

Figure 4:
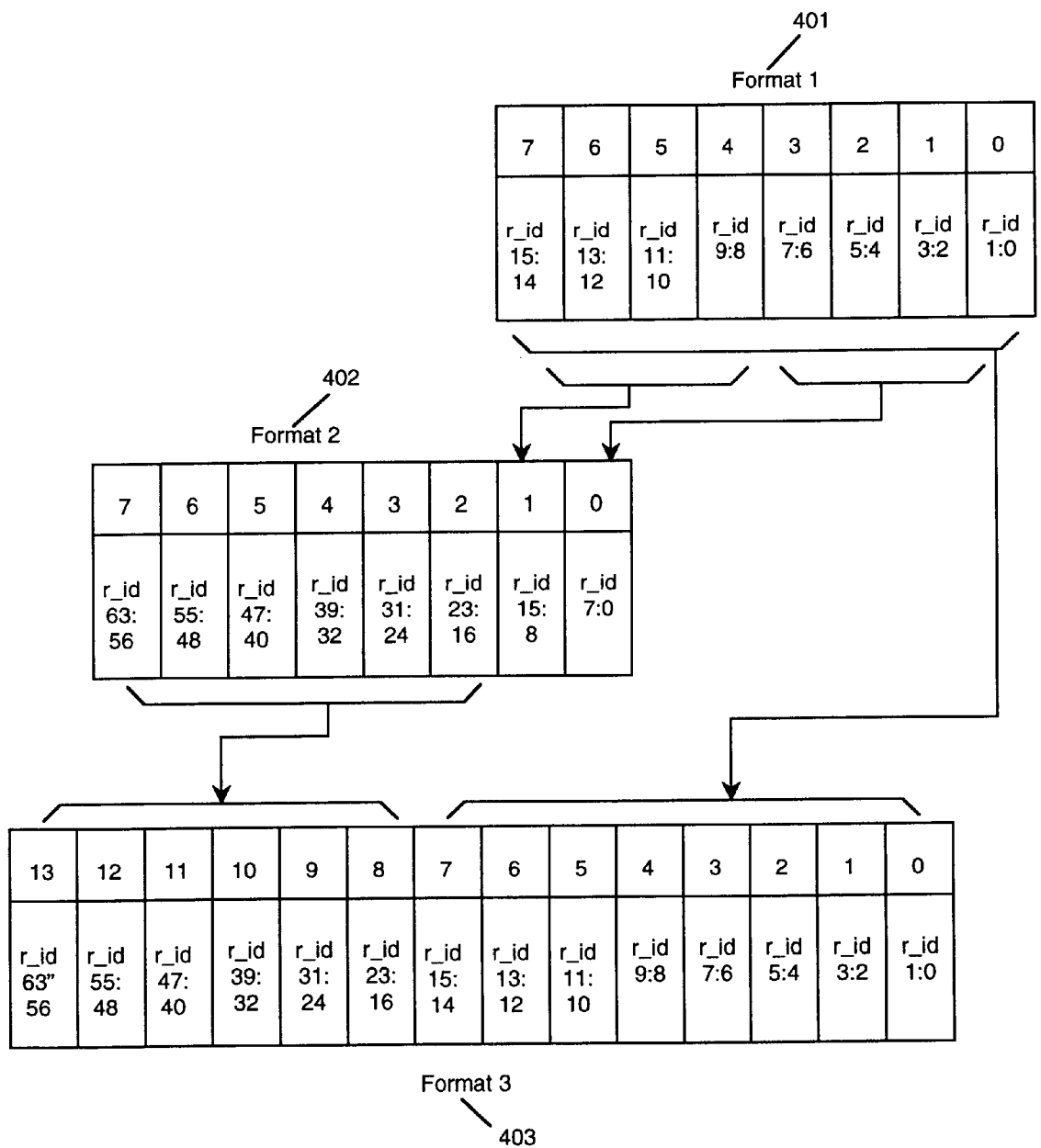
FIG. 4 shows an illustrative example of the various formats in which the share mask may be encoded in accordance with an embodiment of the present invention.

According to the principles of the present invention, sharing mask bits 208 are stored in the memory 104, depending on whether the cache line is shared intra-nodally or inter-nodally, in one of two 8 bit vector formats 401 and 402 shown in FIG. 4.

The format 1 401 is used when all of the entities having a shared copy of the cache line are in the same node in which the shared memory 104 is located. In this format, each bit of the SHARE_MASK indicates whether the cache line is shared between two cells within the node. For example, a value of one (1) in the SHARE_MASK[0] indicates that a copy of the cache line may be stored in two cells whose relative cell IDs are 1 and 0, i.e., r_id [1:0].

The format 2 402 is used when at least one of the entity having a shared copy of the cache line is located in a node different from the node at which the shared memory 104 is located. In this format, each bit of the SHARE_MASK indicates whether the cache line is shared between eight cells from any of the nodes 102. For example, a value of one (1) in the SHARE_MASK[0] indicates that a copy of the cache line may be stored in eight cells whose relative cell IDs are 0, 1,2, 3,4, 5,6, and 7, i.e., r_id [7:0].

As can be seen from FIG. 4, the SHARE_MASK bits 0 through 3, i.e., SHARE_MASK [3:0], and the SHARE_MASK bits 4 through 7, i.e., SHARE_MASK [7:4], of the format 1 may be directly mapped to the SHARE_MASK bit 0, i.e., SHARE_MASK [0], and the SHARE_MASK bit 1, i.e., SHARE_MASK [1], of the format 2, respectively.

In a preferred embodiment of the present invention, the format 3 is used to unify the two memory formats, format 1 and format 2, so that the coherency controller doesn't have to store and manipulate the share mask in two different formats. When a request for a cache line, which requires the cache line to be idle or private, is made, the directory tag associated with the requested cache line is read by the coherency controller, which, based on the state information (e.g., shown in Table 1) and the SHARE_MASK of the cache line, reconstructs the share mask into a fourteen bit format 3 as shown in FIG. 4. As can be seen, the SHARE_MASK bits 0 through 7, i.e., SHARE_MASK [7:0], of format 1 and the SHARE_MASK bits 2 through 7, i.e., SHARE_MASK [7:2], of the format 2 may be directly mapped to the SHARE_MASK bits 0 through 7, i.e., SHARE_MASK [7:0], and the SHARE_MASK bits 8 through 13, i.e., SHARE_MASK [13:8], of the format 3, respectively. Conversions to and from either formats 1 or 2 and format 3 is straightforward and consumes little logic or delay time.

Once the share mask is put into format 3 as shown in FIG. 4, The coherency controller may send invalidate messages to each entity that may have a copy of the cache line as indicated by the share mask.

Optionally, in a preferred embodiment, a partition of the system 100 into one or more logically separate subsystems, each of which may operate independently with respect to each other. For example, each subsystem may comprise a computing system in its own right. The partition is sometimes also referred to as a"protection domain". In this embodiment, sharing memories across the partition may be undesirable, and thus invalidate messages should not be issued across protection domain boundaries. Thus, in this embodiment, a partition mask 501 as shown in FIG. 5 is provided to be accessible to each coherency controller, and may be used to further mask the share mask to prevent any entities outside the protection domain from receiving an invalidate message.

In particular, the partition mask 501 comprises the same number of bits as the format 3 share mask, each corresponding to the respective bits of the format 3 share mask. For example, a one (1) in the bit 0 of the partition mask indicate that cells, whose relative cell IDs are r_id [1:0], are not within the same protection domain, and thus should not receive the invalidate messages. Because the partitions are typically made by grouping closely located entities, and because the relative cell IDs are based on the proximity of the entities, the partition mask provides a convenient way in which to maintain the integrity of the protection domain boundaries.

Additionally, the partition mask may also be used to indicate physically absent cells, and thus to prevent issuing of invalidate messages to a non-existing cell.

In operation, the coherency controller performs an AND logic operation between the respective bits of the share mask in format 3 and the partition mask to produce a further masked shared mask bits. The coherency controller, then, traverses the further masked share mask bit by bit, preferably starting from the least significant bit (LSB). For each further masked share mask bit having a value of a one (1), the coherency controller performs a table lookup operation to determine the actual cell ID(s) corresponding to the relative cell ID(s) associated with further masked share mask bit. In this manner, the coherency controller eventually identifies all cells that may have a copy of the cache line.

The coherency controller then sends an invalidate message to each of the identified cells, and when invalidate responses are received therefrom, allows the request for the cache line to proceed.

As can be appreciated, the SHARED_MASK bits described above can be encoded as a small number of fixed length bits, can track the system entities that may share a cache line, and significantly reduces the coherency message and response traffic, enabling the system bandwidth to be conserved.

In accordance with another aspect of the present invention, in addition to the SHARE_MASK bits, a directory tag (shown in FIG. 2B) contains a 6 bit alias signature field, ALIAS [5:0] 208. The alias signature field contains a signature of the cache line address and/or status information that may be used to detect improper address aliasing.

In some systems, a particular cache line may be allowed to be accessed by one or more different physical addresses, e.g., depending on the current operational mode. In these systems, the high order address bits of the one or more different physical addresses are required to be different. In order to maintain data coherency in the system, only one address should be used at any given time, and any transitions between the different addresses should be allowed to happen only if the coherency state of the cache line is idle, i.e., exclusively owned by the memory. However, since system software is entrusted to enforce this requirement, errors in the system software may cause the same memory location to be referenced from two different addresses.

Another type of address aliasing could occur because the translation between a physical address and a cell address is done in several places, e.g., to optimize system performance. When a programming and/or hardware error causes an error in one of the translations, the same memory location may referenced from two different addresses.

To detect those and other possible address aliasing errors, an alias signature field is computed and stored in the directory tag as shown in FIG. 2B. In an embodiment of the present invention, the alias signature may be computed according to the following equation:

$$alias=cell\_addr[5:0]Ex\text{-}OR\{intlv[2:0], cell\_addr[7:6],1'b0\}EX\text{-}OR\{2'b00,addr[43:40]Ex\_OR\ addr[39:36]\};$$

where the cell_addr[7:0] and the intlv [2:0] are used to compute cell address, the addr [43:36] are the high bits of the physical address of the cache line, Ex-OR represent an exclusive ORing operation between respective bits, { } represent a concatenation of bits enclosed therein, 1'b0 means a single bit having the value 0, and 2'b00 means two bits having the value 00.

In an embodiment of the present invention, there is provided for each cell, a cell map table that contains values for the cell_addr, the intlv and, optionally, offset numbers for each entity within the cell. The intlv indicates, e.g., the memory interleaving policy being used by the cell.

Figure 6:
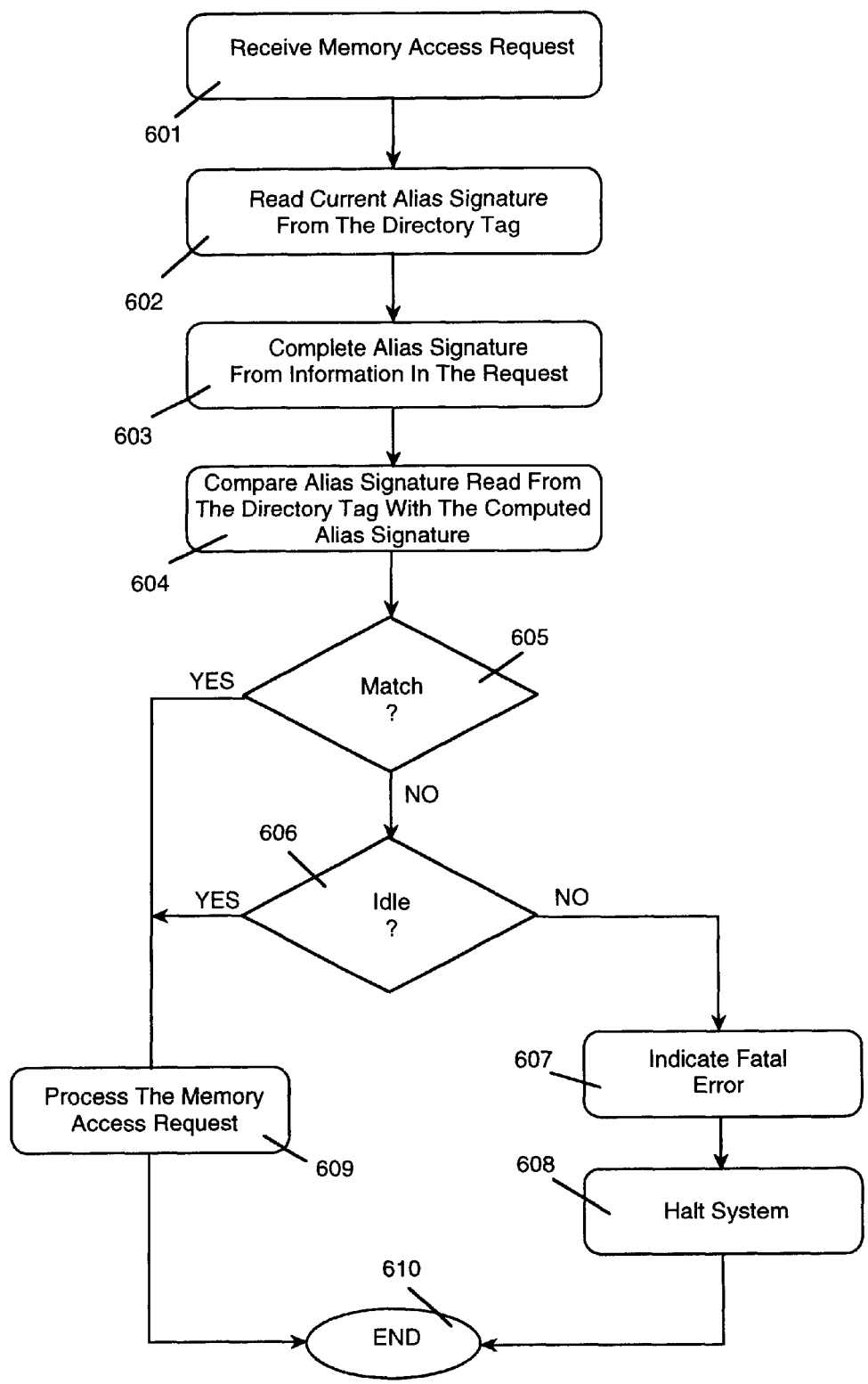
FIG. 6 is flow diagram illustrative of an exemplary embodiment of the alias error detection process in accordance with an embodiment of the principles of the present invention.

The inventive aliasing error detection process according to the principles of the present invention will now be described with references to FIG. 6.

Whenever a new memory access request is made (step 1), the alias signature 208 is read from the directory tag 201 associated with the requested cache line in step 602. A new alias signature is computed from the information, e.g., the address, contained in the new memory access request. In step 603, this newly computed alias signature is compared to the alias signature read from the directory tag.

If a determination is made, in step 605, that the comparison resulted in a match. the memory request is allowed to be processed in the normal manner in step 609.

If, on the other hand, the comparison resulted in the two alias signatures not matching, a determination is made whether the cache line is in an "idle" state, e.g., from table 1. If the cache line is in an idle state, then the memory request is allowed to proceed in step 609 since there is no coherency concern.

If, on the other hand, the cache line state is non-idle, then a fatal error is reported to system software in step 607. The normal processing of the system is halted in step 608 without processing the memory access request, and thus before occurrence of any data corruption due to loss of data coherency.

As can be appreciated, the alias signature mechanism described herein allows detecting an address aliasing error before any corruption of data occurs.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. In particular, although the method of the present invention has been described by examples, the steps of the method may be performed in a different order than illustrated or simultaneously. Those skilled in the art will recognize that these and other variations are possible within the spirit and scope of the invention as defined in the following claims and their equivalents.

What is claimed is:

1. A method of detecting an address aliasing error in a computing system having at least one memory having stored therein at least one cache line, comprising:

providing a directory tag alias signature of said at least one cache line, said directory tag alias signature having encoded therein a signature of an address information of said at least one cache line;

detecting a request to access said at least one cache line, said request including a requested address information of said at least one cache line;

computing a computed alias signature based on said requested address information and a cell address;

comparing said directory tag alias signature with said computed alias signature; and indicating an occurrence of said address aliasing error in response to said directory tag alias signature not matching said computed alias signature.

2. The method of detecting an address aliasing error in accordance with claim 1, further comprising:

disallowing said request if said occurrence of said address aliasing error is indicated.

3. The method of detecting an address aliasing error in accordance with claim 2, further comprising:

determining whether said at least one cache line is in an idle state, said idle state indicating that said at least one cache line is exclusively owned by said at least one memory; and wherein said step of indicating said occurrence of said address aliasing error comprises:

indicating said occurrence of said address aliasing error if said cache line is not in said idle state, and if said directory tag alias signature and said computed alias signature do not match each other.

4. The method of detecting an address aliasing error in accordance with claim 3, further comprising:

allowing said request if said directory tag alias signature and said computed alias signature match each other.

5. The method of detecting an address aliasing error in accordance with claim 4, further comprising:

allowing said request if said at least one cache line is in said idle state, and even if said directory tag alias signature and said computed alias signature match each other.

6. The method of detecting an address aliasing error in accordance with claim 5, wherein:

said request is made by a processing element in said computing system; and wherein said directory tag alias signature comprises a plurality of bits stored in a directory tag associated with said at least one cache line, values of said plurality of bits being calculated by exclusive-ORing together respective ones of a plurality of physical address bits of said at least one cache line and a plurality of address bits of said processing element.

7. A method of detecting an address aliasing error in a computing system having at least one memory having stored therein at least one cache line, comprising:

providing a directory tag alias signature of said at least one cache line, said directory tag alias signature having encoded therein a signature of an address information of said at least one cache line;

detecting a request to access said at least one cache line, said request including a requested address information of said at least one cache line;

determining a computed alias signature based on said requested address information and a cell address;

comparing said directory tag alias signature with said computed alias signature;

determining a state of said at least one cache line; and indicating an occurrence of said address aliasing error in response to said directory tag alias signature not matching said computed alias signature and said state of said at least one cache line being in an idle state.

8. A method of detecting an address aliasing error in a computing system having at least one memory having stored therein at least one cache line, comprising:

providing a directory tag alias signature of said at least one cache line, said directory tag alias signature having encoded therein a signature of an address information of said at least one cache line;

detecting a request to access said at least one cache line, said request including a requested address information of said at least one cache line;

computing a computed alias signature based on said requested address information and a cell address;

comparing said directory tag alias signature with said computed alias signature; and allowing said request to access said at least one cache line in response to said directory tag alias signature matching said computed alias signature.

9. A method of detecting an address aliasing error in a computing system having at least one memory having stored therein at least one cache line, comprising:

providing a directory tag alias signature of said at least one cache line, said directory tag alias signature having encoded therein a signature of an address information of said at least one cache line;

detecting a request to access said at least one cache line, said request including a requested address information of said at least one cache line;

computing a computed alias signature based on said requested address information and a cell address;

comparing said directory tag alias signature with said computed alias signature;

determining a state of said at least one cache line; and allowing said request to access said at least one cache line in response to said directory tag alias signature matching said computed alias signature and said state of said at least one cache line being in an idle state.

10. A method of detecting an address aliasing error in a computing system having at least one memory having stored therein at least one cache line, comprising:

providing a directory tag alias signature of said at least one cache line, said directory tag alias signature having encoded therein a signature of an address information of said at least one cache line;

detecting a request to access said at least one cache line, said request including a requested address information of said at least one cache line, wherein said request is made by a processing element in said computing system;

computing a computed alias signature based on values of bits calculated by exclusiving-Oring together respective ones of a plurality of physical address bits of said at least one cache line and a plurality of address bits of said processing element; were said directory tag alias signature comprises said calculated bits stored in a directory tag associated with said at least one cache line comparing said directory tag alias signature with said computed alias signature;

allowing said request to access said at least one cache line in response to said directory tag alias signature matching said computed alias signature; and indicating an occurrence of said address aliasing error in response to said directory tag alias signature not matching said computed alias signature.

* * * * *